United States Patent
Loftin

(10) Patent No.: US 10,582,803 B1
(45) Date of Patent: Mar. 10, 2020

(54) CULINARY UTENSIL FOR HEATING FOLDABLE FOOD PRODUCTS

(71) Applicant: Russ Loftin, Laguna Niguel, CA (US)

(72) Inventor: Russ Loftin, Laguna Niguel, CA (US)

(73) Assignee: Russ Loftin, Laguna Niguel, CA (US)

( * ) Notice: Subject to any disclaimer, the term of this patent is extended or adjusted under 35 U.S.C. 154(b) by 0 days.

(21) Appl. No.: 16/540,980

(22) Filed: Aug. 14, 2019

Related U.S. Application Data

(60) Provisional application No. 62/718,836, filed on Aug. 14, 2018.

(51) Int. Cl.
*A47J 37/08* (2006.01)
*A47J 37/06* (2006.01)

(52) U.S. Cl.
CPC ....... *A47J 37/0885* (2013.01); *A47J 37/0857* (2013.01); *A47J 37/0871* (2013.01); *A47J 37/0688* (2013.01)

(58) Field of Classification Search
CPC . A47J 37/0885; A47J 37/0871; A47J 37/0857
USPC ............................ 99/394, 393, 399, 439, 426
See application file for complete search history.

(56) References Cited

U.S. PATENT DOCUMENTS

| | | | |
|---|---|---|---|
| 2,664,812 A * | 1/1954 | Molina | A47J 37/1295 249/120 |
| 3,308,748 A | 3/1967 | Jalbert | |
| 3,511,172 A * | 5/1970 | Jones | A47J 43/18 249/120 |
| 3,693,537 A | 9/1972 | Johnson et al. | |
| 3,745,911 A * | 7/1973 | Kennedy, Jr. | A47J 43/18 99/426 |
| 3,759,165 A | 9/1973 | Wallace | |
| 3,817,163 A * | 6/1974 | Kizziar | A47J 43/18 99/353 |
| D249,219 S | 9/1978 | Stence | |
| 4,154,155 A | 5/1979 | Brignall | |
| 4,517,887 A | 5/1985 | Childress | |
| 5,072,664 A * | 12/1991 | Tienor | A47J 37/1295 99/353 |
| 5,937,743 A | 8/1999 | Overstreet | |
| 6,979,803 B1 * | 12/2005 | Webb | A47J 37/0807 219/386 |
| 9,131,805 B1 | 9/2015 | Wilkes | |
| 2016/0037783 A1 * | 2/2016 | Drees | A47J 37/1295 99/393 |
| 2017/0035246 A1 | 2/2017 | Roostaie | |
| 2017/0303742 A1 * | 10/2017 | Gallego, II | A47J 37/0871 |

OTHER PUBLICATIONS

Taco Toaster, www.WideOpenEats.com., Sep. 11, 2017.

* cited by examiner

*Primary Examiner* — Reginald Alexander
(74) *Attorney, Agent, or Firm* — Snell & Wilmer LLP

(57) ABSTRACT

A culinary utensil which may be for use to retain a food product and may be for a toaster. The culinary utensil may include a body having a first side face and a second side face facing opposite the first side face, and a bottom face. A clip may extend longitudinally along the bottom face and be positioned from the bottom face to define a slot configured to receive the food product between the clip and the bottom face.

20 Claims, 13 Drawing Sheets

CULINARY UTENSIL FOR HEATING FOLDABLE FOOD PRODUCTS

CROSS REFERENCE TO RELATED APPLICATIONS

This application claims the benefit of U.S. Provisional Application No. 62/718,836, filed Aug. 14, 2018, the entire contents of which are incorporated by reference herein.

FIELD

The present application concerns embodiments of culinary utensils.

BACKGROUND

Tacos are among the most popular dishes resulting in part from their inherent versatility. Tacos have a wide range of different regional recipes and varieties that appeal to a wide spectrum of the public. Preparing a taco shell, however, can be a time consuming and a dangerous task. Traditionally, taco shells are prepared by placing tortillas onto a hot pan and repeatedly flipping them by hand until they are sufficiently heated. Special care and attention must be taken to not burn one's fingertips during the flipping process. After the tortilla has been sufficiently heated, it may then be used as a taco shell. As a result of this heating process, the tortilla consequently becomes firm and resistant to changes in its shape. For example, the tortilla may crack if a user tries to fold the tortilla in half, which is what is customarily done after placing the taco ingredients in the tortilla. Even if the tortilla does not crack, the tortilla may unfold, due to its resistance in changing its shape, and spill the contents all over the user.

Taco shells are also commonly prepared by first frying the tortillas in boiling hot oil and then folding them over a rack to cool in the folded position. However, having a substantial source of boiling oil near a user is a hazard. Moreover, frying the tortillas in oil is also not an appealable proposition to those who are health conscious. One of the most common causes for early death is heart disease with high cholesterol and high fat foods, such as foods prepared in oil, being the main culprits.

Additionally, due to modern employment demands people have less free time than they have had in the past. As a result, people are now finding themselves having to choose between preparing home cooked meals or spending quality time with their families. In order to prepare a taco shell using the hot pan method, a pan must be first heated and individual tortillas placed onto the pan, individually flipped, and removed by hand. To prepare a taco shell using the hot oil method, a pan must be first filled with oil, then brought up to a boiling temperature, then the tortillas must then be placed in the hot oil for a period of time and then finally removed to cool before being ready to eat. These two processes are unnecessarily time-consuming and taxing on the user.

Similar processes and issues arise out of the preparation of other foldable food products such as, flatbread, naan, pita, focaccia, injera, malawach, or pizza crust, among others.

SUMMARY

The present disclosure is directed to embodiments of a culinary utensil. The culinary utensil may be for use to retain a food product and may be for a toaster. Embodiments of the present disclosure may include a culinary utensil for a toaster, the culinary utensil including a body having a first side face and a second side face facing opposite the first side face, and a bottom face. The body may be configured to be at least partially covered by a food product and provide support for the food product when the food product is being heated by the toaster. A clip may extend longitudinally along the bottom face and may be positioned from the bottom face to define a slot configured to receive the food product between the clip and the bottom face, and may have a first portion coupled to the body and a second portion defining an entry configured for the food product to be passed through to be received by the slot.

Embodiments of the present disclosure may include a method including positioning a food product in a slot of a culinary utensil between a clip and a body of the culinary utensil. The method may include positioning the culinary utensil in a heating slot of a toaster with the food product positioned between the clip and the body of the culinary utensil. The method may include heating the food product positioned between the clip and the body of the culinary utensil within the heating slot of the toaster.

Embodiments of the present disclosure may include a culinary utensil for use to retain a food product. The culinary utensil may include a body configured to be at least partially covered by the food product and provide support for the food product. The body may include a first side face and a second side face being opposite the first side face. The body may include a bottom face. The culinary utensil may include a clip configured to retain the food product when the food product is placed between the clip and the body.

BRIEF DESCRIPTION OF THE DRAWINGS

Other systems, methods, features, and advantages of the embodiments of the present disclosure will be apparent to one skilled in the art upon examination of the following figures and detailed description. Component parts shown in the drawings are not necessarily to scale, and may be exaggerated to better illustrate the important features of the present disclosure.

DETAILED DESCRIPTION

In the following detailed description, numerous specific details are set forth to provide an understanding of the present disclosure. It will be apparent, however, to one of ordinary skill in the art that elements of the present disclosure may be practiced without some of these specific details. In certain instances, certain structures and techniques have not been shown in detail to avoid unnecessarily obscuring the present disclosure.

Toasters are an appliance that may offer a combination of versatility, ease of operation, and quick processing times. Many toasters comprise a common household appliance. Toasters generally have at least one heating slot where a food product may be heated by being placed into and then subsequently lowered into the slot. Once the food product has been lowered into the heating slot, a plurality of heating elements on both sides of the food product may activate and begin to quickly heat up the food product. After a predetermined period of time, the plurality of heating elements may be deactivated and the food product may automatically raise out of the heating slot to be removed by a user.

While many different types of food products have been adapted for use in toasters, other food products may not be practically used in toasters due to several inherent limitations such as the food product's flexibility, malleability, or pliability. If a flexible food product, such as a tortilla, is placed in the heating slot of a toaster the food product may bend or form kinks under its own weight resulting in a deformed shape before the warming process even begins. As a consequence of the warming process the food product may become hard. When the warming process has been completed the food product emerges hardened and deformed. If a user tries, for example, to place various ingredients in the hardened tortilla to make a taco, the deformed shape may prevent the ingredients from being held within the tortilla. If a user then tries to reshape the tortilla, by plying it open for example, the tortilla may crack and break apart due to its hardened state. Other flat breads may have similar properties.

There is a need for a culinary utensil that provides support for food products that may be flexible, malleable, or pliable when the food products are being heated by a toaster.

Figure 1A:
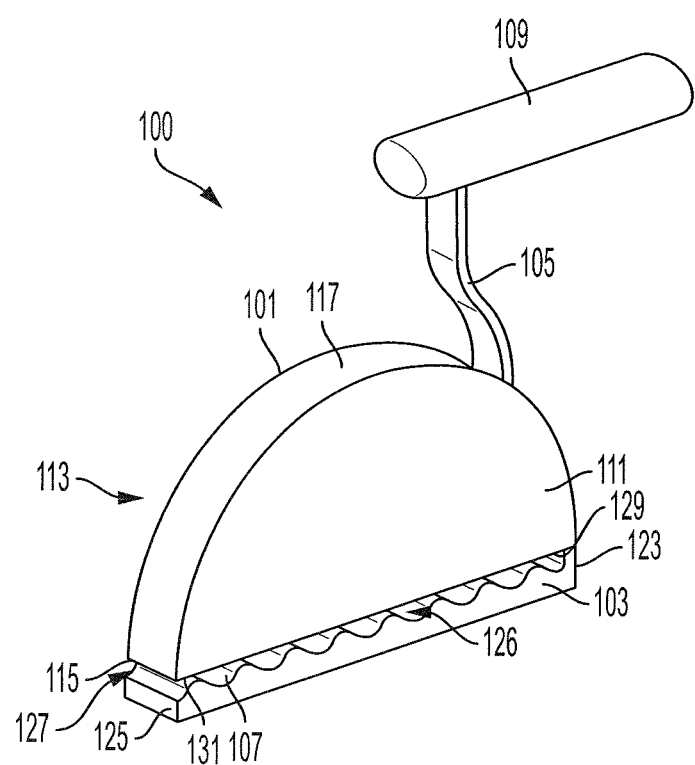
FIG. 1A is a perspective view of a culinary utensil according to an embodiment of the present disclosure.

FIG. 1A shows an embodiment of a culinary utensil 100 for a toaster having a body 101, a clip 103, and a handle 105.

The culinary utensil 100 includes a body 101 that has a length, a width, and a height. The length, width, and height may be dimensioned so as to fit within a standard toaster heating slot. For example, the length may be 6 inches, the width may be 1.5 inches, and the height may be 4.25 inches. In other embodiments, other lengths, widths, and heights may be utilized as desired. The length, width, and height in certain embodiments may be scaled based on the size of the toaster heating slot that may be utilized. The body 101 is configured to be at least partially covered by a food product. In some embodiments, the food product may completely cover the body 101. In some embodiments, the food product 119 may be a tortilla (marked in FIG. 1B). In other embodiments, the food product may be any other food product capable of being folded onto or otherwise positioned onto the body 101. For example, the food product may be flatbread, naan, pita, focaccia, injera, malawach, or pizza crust, among others. Other non-bread food products may be utilized as well.

Figure 1B:
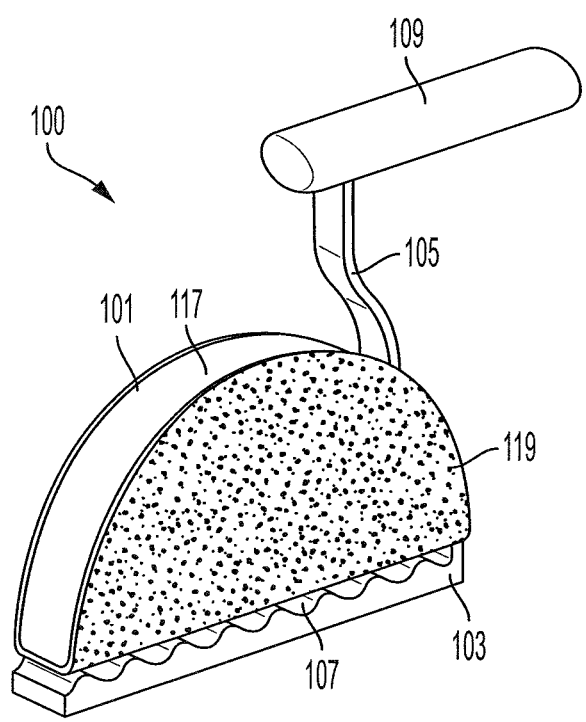
FIGS. 1B-1E illustrate the use of the culinary utensil of FIG. 1A according to an embodiment of the present disclosure.
Figure 1C:
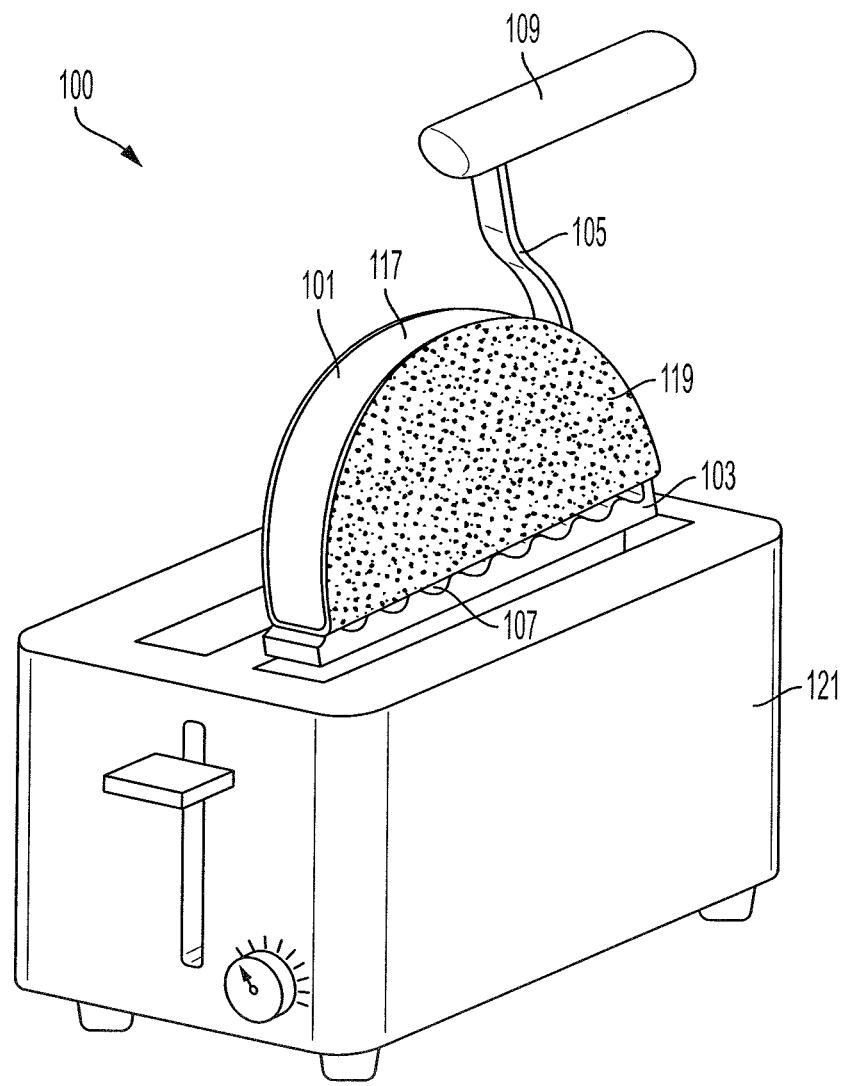

The body 101 is also configured to provide support for the food product when the food product is being heated by the toaster 121 (marked in FIG. 1C). In some embodiments, the support for the food product may be in the form of providing a structure for the food product to be folded onto the body 101. For example, a user may fold a tortilla into a semicircular shape and slide the folded tortilla onto the body 101. The curved part of the folded tortilla may rest between the clip 103 and the body 101.

In some embodiments, the support for the food product may be in the form of providing a rigid structure that prevents both sides of a folded food product from touching. As depicted, the body 101 has a solid cross section. However, other cross sectional configurations may be used interchangeably according to various embodiments.

The body 101 may be configured to be inserted into a heating slot of a toaster.

The body 101 may have a first side face 111 and a second side face 113 each defined by the length and the height of the body with the first side face 111 being opposite the second side face 113. The second side face 113 faces opposite the first side face 111 (both a second side face 513 and a first side face 511 are both more clearly shown in FIGS. 5A and 5B). The body 101 may have a bottom face 115 defined by the length and the width. The bottom face 115 may face downward relative to the first side face 111 and the second side face 113 and may face towards the upper surface of the clip 103. The body 101 may have one or more connecting faces extending between the first side face 111 and the second side face 113. As depicted, the one or more connecting faces may include a top face 117.

The first side face 111 and the second side face 113 may take the form of various different shapes. As depicted, the first side face 111 and the second side face 113 are semicircular in shape. However, other shapes may be used interchangeably according to various embodiments.

The culinary utensil 100 may include a clip 103 coupled to and extending longitudinally along the bottom face 115 and being positioned from the bottom face 115 to define a slot 126 for receiving the food product between the clip 103 and the bottom face 115. The clip 103 may have a first portion 123 coupled to the body 101 and a second portion 125 defining an entry 127 configured for the food product to be passed through to be received by the slot 126. The first portion 123 may close an end of the slot 126 and accordingly may prevent the food product from sliding off the culinary utensil 100 when being passed through the slot 126 in a direction towards the first portion 123.

The clip 103 may at least partially cover the bottom face 115 of the body 101. The clip 103 may be configured to retain the food product when the food product is placed between the clip 103 and the body 101. For example, after the tortilla has been folded onto the body 101, the culinary utensil 100 may be placed into a heating slot within the toaster to be heated. After the toaster has completed the heating process, the culinary utensil 100 may be removed from the toaster with the clip 103 providing support to the bottom of the tortilla as the culinary utensil 100 is lifted out of the heating slot within the toaster.

The clip 103 may have a plurality of grooves 107 that are configured to provide transfer of heat from the toaster to the food product. For example, the plurality of grooves 107 may assist in the transfer of heat. When the tortilla is being heated by the toaster, the plurality of grooves 107 may provide a pathway for heat to transfer to the bottom of the tortilla. As depicted, the plurality of grooves 107 may be sinusoidal in shape. However, other shapes may be used in other embodiments.

The first portion 123 of the clip 103 may comprise a first end portion of the clip 103 (as depicted in FIG. 1A). The second portion 125 of the clip 103 may comprise a second end portion of the clip 103 (as depicted in FIG. 1A). The clip 103 may extend longitudinally from the first end portion of the clip 103 to the second end portion of the clip 103 and may extend along the length of the bottom face 115.

The bottom face 115 may include a first end portion 129 and a second end portion 131, and the length of the bottom face 115 may extend from the first end portion 129 to the second end portion 131. The first end portion 129 and second end portion 131 may define the outer boundaries of the body 101. The first portion 123 of the clip 103 may be positioned at the first end portion 129 of the bottom face 115 and the second portion 125 of the clip 103 may be positioned at the second end portion 131 of the bottom face 115. The clip 103 may extend substantially parallel with the bottom face 115 from the first portion 123 of the clip 103 to the second portion 125 of the clip 103.

The first portion 123 of the clip 103 may extend upward from the longitudinal portion of the clip 103 to couple to the body 101. The upward extent of the first portion 123 accordingly may close the end of the slot 126. The second portion 125 of the clip 103, as shown in FIG. 1A, may not be coupled to the body 101. The entry 127 may be formed by the second portion 125 of the clip 103 not coupling to the body 101. The entry 127 may comprise an opening that allows the food product to be passed through to be received by the slot 126. The opening may be formed by a space between the second portion of the clip 103 and the body 101, for example, the second end portion 131 of the bottom face 115. In other embodiments, the entry 127 may have different forms, for example an opening latch, or lock or snap may form an entry, among other forms of entries.

In one embodiment, the clip 103 may be coupled to the bottom face 115 of the body 101. In some embodiments, the clip 103 may be coupled to the first side face 111 and/or the second side face 113. In other embodiments, the clip 103 may be coupled to the one or more connecting faces. The clip 103 may be dimensioned so as to not extend over the sides of the body 101, including the side faces 111, 113. In some embodiments, the clip 103 may have a U-shaped cross section.

In one embodiment, the clip 103 may be configured to bend away from the body 101 to facilitate easier addition and removal of the food product 119. In other embodiments, the clip 103 may be configured to be a rigid component of the culinary utensil 100. In some embodiments, the clip 103 may provide friction to the bottom of the food product 119 to prevent the food product 119 from sliding off the clip 103.

In one embodiment, the clip 103 may be positioned from the bottom face 115 to define a slot 126 for receiving the food product between the clip 103 and the bottom face 115, and may be in contact with the bottom face 115. In one embodiment, the clip 103 may be positioned from the bottom face 115 to define a slot 126 for receiving the food product between the clip 103 and the bottom face 115, and may not be in contact with the bottom face 115 (a gap between the entirety of the clip 103 and the bottom face 115). In one embodiment, a distance between the clip 103 and the bottom face 115 or other portion of the body 101 may be adjustable, for example, in an embodiment in which the clip 103 may be moved to and from the body 101. In such an embodiment, the clip 103 may be adjusted to account for various sizes (e.g., thicknesses) of food products that may be used with the culinary utensil 100. The clip 103 may be adjusted at the first portion 123 of the clip 103, or at another portion of the clip 103 to move the clip 103 to the desired position. In one embodiment, the clip 103 may be separable from the body 101 to allow for the food product to be positioned between the body 101 and the clip 103.

In embodiments, the configuration of the clip 103 may be varied as desired. For example, the clip 103 may include multiple prongs or portions, or may be positioned on or over a side face 111, 113, or a connecting face, or other portion of the culinary utensil 100. The portions 123, 125 of the clip 103 may be variably positioned, for example, adjacent a connecting face of the culinary utensil 100 or a side face 111, 113, or may be coupled to the culinary utensil 100 in a variety of locations.

The culinary utensil 100 may include a handle 105 coupled to the body 101. In some embodiments, the handle 105 may be attached to the body 101 via an adhesive or bonding. In some embodiments, the handle 105 and the body 101 may form a single integral part. In other embodiments, the handle 105 may be removably coupled to the body 101. The handle 105 may include a grip 109. The grip 109 may aid a user in gripping the handle 105. The handle 105 may be configured to extend above the top of body 101 such that the handle 105 extends exterior of the heating slot of the toaster in order to better assist the user in gripping the grip 109. In some embodiments, the handle 105 may be curved so that at least one of the handle 105 or the grip 109 extends past the front or rear of the toaster.

The grip 109 may form an integral part of the handle 105. In other embodiments, the grip 109 may be a separate component attached to the handle 105. The grip 109 may be made of the same material as the handle 105. In other embodiments, the grip 109 may be made of silicone or a rubber-like material to facilitate easy gripping as well as insulation from the heat of the toaster.

In some embodiments, at least one of the body 101, the clip 103, or the handle 105 may be manufactured from a metallic material. In other embodiments, at least one of the body 101, the clip 103, or the handle 105 may be manufactured form a high temperature plastic material. According to various embodiments, at least one of the body 101, the clip 103, or the handle 105 may be manufactured from a ceramic material. In one embodiment, at least one of the body 101, the clip 103, or the handle 105 may be made of one or more of a metallic material, a high temperature plastic, or a ceramic material.

FIGS. 1B-1E illustrate a use of the culinary utensil 100 of FIG. 1A according to an embodiment of the present disclosure.

FIG. 1B illustrates the culinary utensil 100 with a food product 119 folded onto the body 101. As depicted, the food product 119 is a tortilla. However, other foldable food products may be used with the culinary utensil 100 interchangeably according to various embodiments. For example, the food product may be flatbread, naan, pita, focaccia, injera, malawach, or pizza crust, among others.

During use, a user may pass the food product 119 through the slot 126 of the culinary utensil 100 to position the food product 119 between the clip 103 and the body 101 of the culinary utensil 100. The user may slide the food product 119 into and in the slot 126 through the entry 127. In an embodiment in which the entry 127 is an opening, the user may slide the food product 119 through the opening. The user may fold the food product 119 before the food product is positioned in the slot 126. In other embodiments, the user may first position the food product within the slot 126 and slide the food product 119 between the body 101 and the clip 103 and then fold the food product 119 onto the body 101. The user may fold the food product 119 against both the first side face 111 and the second side face 113 of the body 101 before heating the food product 119 within the heating slot of the toaster.

In an embodiment in which the clip 103 is adjustable, the user may adjust the position of the clip 103 to position the food product 119 in the slot 126 and couple the food product 119 to the culinary utensil 100.

FIG. 1C illustrates the culinary utensil 100 with the food product 119 folded onto the body 101 in preparation to be heated by being positioned over the heating slot within the toaster 121. The user may position the culinary utensil 100 with the food product 119 over the slot by using the grip 109. In some embodiments, after the food product 119 has been folded onto the body 101 the food product 119 may remain folded against the body 101. In other embodiments, after the food product 119 has been folded onto the body 101 the food product 119 may revert back to its original unfolded form. The user may need to apply pressure to force the sides of the food product 119 against the body 101 while the culinary utensil 100 and the food product 119 is placed within the heating slot of the toaster 121 to be heated.

Figure 1D:
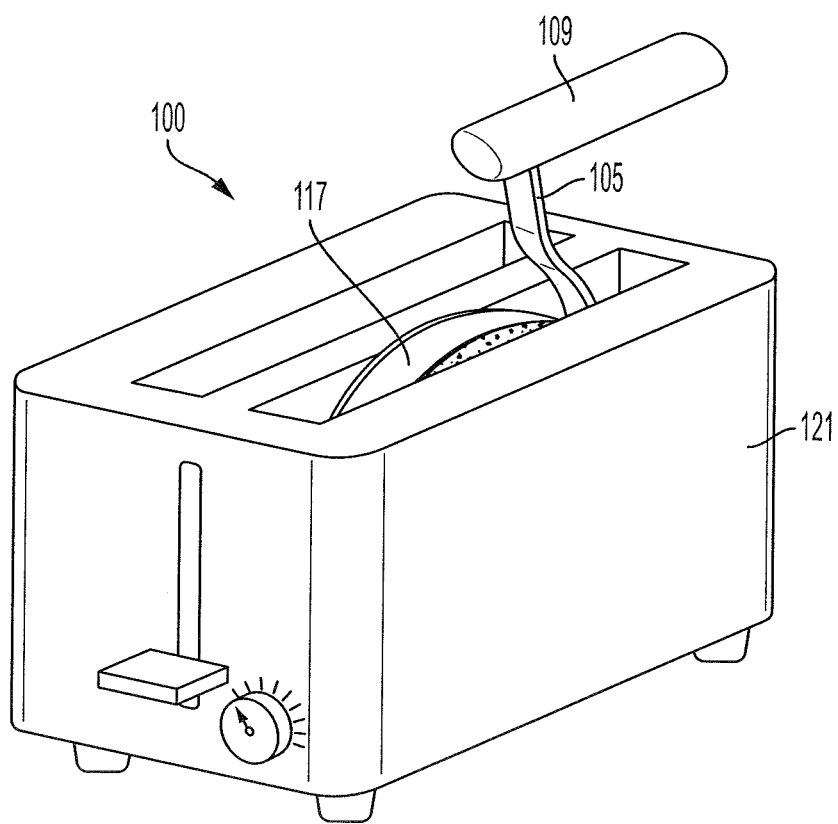

FIG. 1D illustrates the culinary utensil 100 with the food product 119 disposed within the heating slot of the toaster 121 and being heated. The culinary utensil 100 has been positioned in the heating slot of the toaster 121 with the food product 119 positioned between the clip 103 and the body 101 of the culinary utensil 100. As depicted, the handle 105 may be positioned exterior of the heating slot and may extend above the top of the toaster 121 in order to better assist the user in gripping the grip 109. In some embodiments, the handle 105 may be curved so that at least one of the handle 105 or the grip 109 extends past the front or rear of the toaster 121. The food product 119 is heated, positioned between the clip 103 and the body 101 of the culinary utensil 100.

Figure 1E:
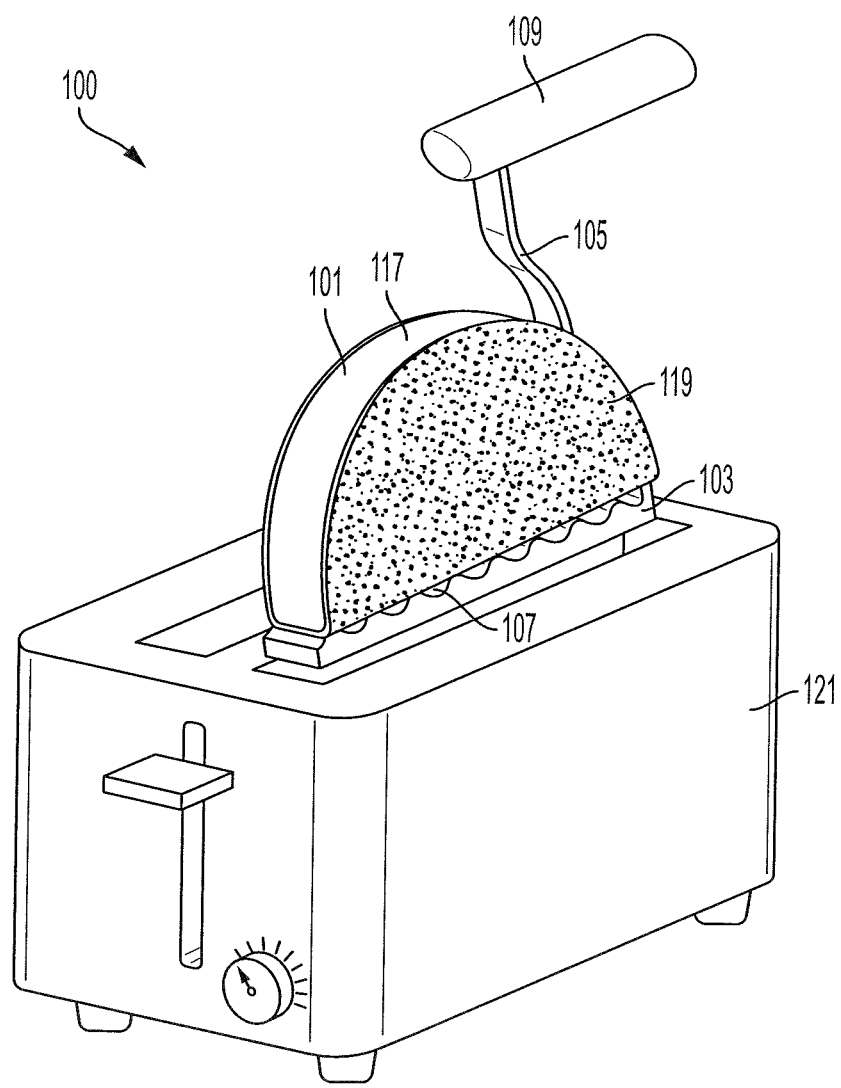

FIG. 1E illustrates the culinary utensil 100 with the now heated food product 119 being removed from the heating slot of the toaster 121. In some embodiments, the food product 119 may be removed from the culinary utensil 100 by sliding the food product 119 off of the culinary utensil 100. In other embodiments, the food product 119 may be removed from the culinary utensil 100 by bending the clip 103 away from the body 101 of the culinary utensil and then sliding the food product 119 off of the culinary utensil 100. In other embodiments, the clip 103 may be adjusted to allow the food product 119 to be separated from the culinary utensil 100.

The features of the culinary utensil 100 may be utilized with any embodiment of culinary utensil disclosed herein.

Figure 2A:
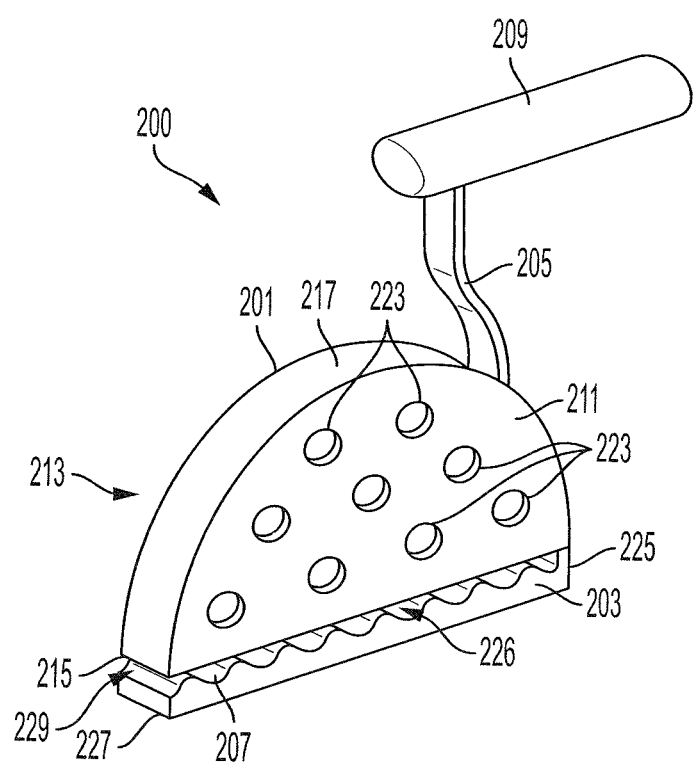
FIG. 2A is a perspective view of a culinary utensil according to an embodiment of the present disclosure.

FIG. 2A shows an embodiment of a culinary utensil 200 for a toaster having a body 201, a clip 203, and a handle 205.

The culinary utensil 200 includes a body 201 that has a length, a width, and a height. The length, width, and height may be dimensioned so as to fit within a standard toaster slot. The body 201 is configured to be at least partially covered by a food product. In some embodiments, the food product may completely cover the body 201. In some embodiments, the food product 119 may be a tortilla (marked in FIG. 1B). In other embodiments, the food product may be any other food product capable of being folded onto the body 201. For example, the food product may be flatbread, naan, pita, focaccia, injera, malawach, or pizza crust, among others.

The body 201 may be configured to provide support for the food product when the food product is being heated by the toaster 121 (marked in FIG. 1C). In some embodiments, the support for the food product may be in the form of providing a structure for the food product to be folded onto the body 201. For example, a user may fold a tortilla into a semi-circular shape and slide the folded tortilla onto the body 201. The curved part of the folded tortilla may rest between the clip 203 and the body 201.

In some embodiments, the support for the food product may be in the form of providing a rigid structure that prevents both sides of a folded food product from touching. As depicted, the body 201 has a solid cross section. However, other cross sectional configurations may be used interchangeably according to various embodiments.

The body 201 may have a first side face 211 and a second side face 213 each defined by the length and the height, the first side face 211 being opposite the second side face 213. The body 201 may have a bottom face 215 defined by the length and the width. The body 201 may have one or more connecting faces extending between the first face 211 and the second face 213. As depicted, the one or more connecting faces is a top face 217.

The first side face 211 and the second side face 213 may take the form of various different shapes. As depicted, the first side face 211 and the second side face 213 may each be semi-circular in shape. However, other shapes may be used interchangeably according to various embodiments.

The body 201 may have a plurality of apertures 223 extending through and between the first side face 211 and the second side face 213. As depicted, the plurality of apertures 223 are circular in shape. However, other shapes may be used interchangeably according to various embodiments. In some embodiments, the plurality of apertures 223 may not extend all the way through and between the first side face 211 and the second side face 213.

The culinary utensil 200 may include a clip 203 coupled to and extending longitudinally along the bottom face 215 and being positioned from the bottom face 215 to define a slot 226 for receiving the food product between the clip 203 and the bottom face 215. The clip 203 may have a first portion 225 coupled to body 201 and a second portion 227 defining an entry 229 configured for the food product to be passed through to be received by the slot 226. The first portion 225 may prevent the food product from sliding off the culinary utensil 200.

The clip 203 may be configured to retain the food product when the food product is placed between the clip 203 and the body 201. For example, after the tortilla has been folded onto the body 201, the culinary utensil 200 may be placed into a heating slot within the toaster to be heated. After the toaster has completed the heating process, the culinary utensil 200 may be removed from the toaster with the clip 203 providing support to the bottom of the tortilla as the culinary utensil 200 is lifted out of the heating slot within the toaster.

The clip 203 may have a plurality of grooves 207 that are configured to provide transfer of heat from the toaster to the food product. For example, when the tortilla is being heated by the toaster, the plurality of grooves 207 provide a pathway for heat to transfer to the bottom of the tortilla. As depicted, the plurality of grooves 207 are sinusoidal in shape. However, other shapes may be used interchangeably according to various embodiments.

The clip may be coupled to the bottom face 215 of the body 201. In some embodiments, the clip may be coupled to the first side face 211 and/or the second side face 213. In other embodiments, the clip 203 may be coupled to the one or more connecting faces or another portion of the culinary utensil 200.

In some embodiments, the clip 203 may be configured to bend away from the body 201 to facilitate easier addition and removal of the food product. In other embodiments, the clip 203 may be configured to be a rigid component of the culinary utensil 200.

The culinary utensil 200 includes a handle 205 coupled to the body 201. In some embodiments, the handle 205 may be attached to the body 201 via an adhesive or bonding. In some embodiments, the handle 205 and the body 201 may form a single integral part. In other embodiments, the handle 205 may be removably coupled to the body 201. The handle 205 may extend above the top of the toaster in order to better assist the user in gripping the grip 209. In some embodiments, the handle 205 may be curved so that at least one of the handle 205 or the grip 209 extends past the front or rear of the toaster.

The handle 205 may have a grip 209 to aid a user in gripping the handle 205. In some embodiments, the grip 209 may form an integral part of the handle 205. In other embodiments, the grip 209 may comprise a separate component attached to the handle 205. The grip 209 may be made of the same material as the handle 205. In other embodiments, the grip 209 may be made of silicone or a rubber-like material to facilitate easy gripping and insulation from the heat of the toaster.

In some embodiments, at least one of the body 201, the clip 203, or the handle 205 may be manufactured from a metallic material. In other embodiments, at least one of the body 201, the clip 203, or the handle 205 may be manufactured form a high temperature plastic material. In some embodiments, at least one of the body 201, the clip 203, or the handle 205 may be manufactured from a ceramic material. In one embodiment, at least one of the body 201, the clip 203, or the handle 205 may be made of one or more of a metallic material, a high temperature plastic, or a ceramic material.

Figure 2B:
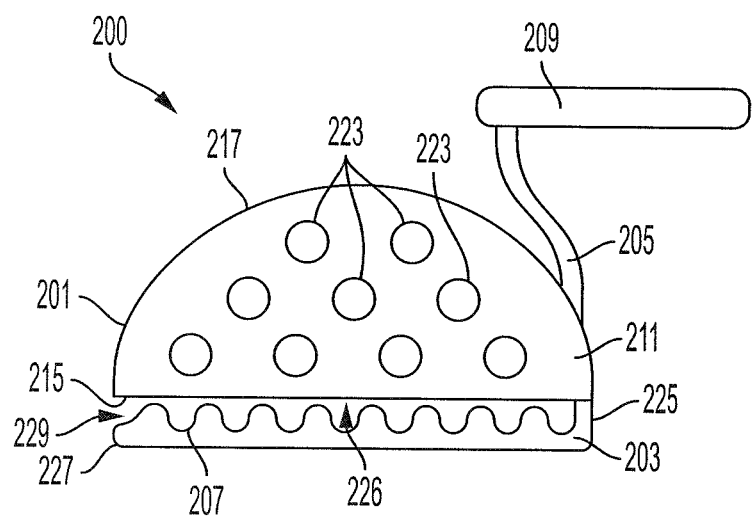
FIG. 2B is a side perspective view of the culinary utensil of FIG. 2A according to an embodiment of the present disclosure.

FIG. 2B is a side perspective view of the culinary utensil 200 of FIG. 2A according to an embodiment of the present disclosure.

The features of the culinary utensil 200 may be utilized with any embodiment of culinary utensil disclosed herein.

Figure 3A:
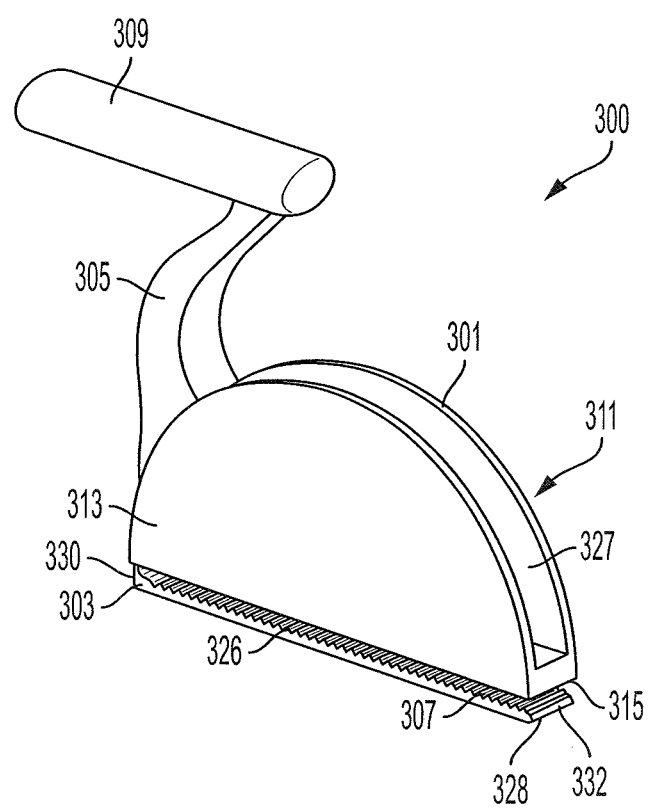
FIG. 3A is a perspective view of a culinary utensil according to an embodiment of the present disclosure.

FIG. 3A shows an embodiment of a culinary utensil 300 for a toaster having a U-shaped body 301, a clip 303, and a removable handle 305.

The culinary utensil 300 includes a U-shaped body (body) 301 that has a length, a width, and a height. The length, width, and height may be dimensioned so as to fit within a standard toaster slot. The body 301 is configured to be at least partially covered by a food product. In some embodiments, the food product may completely cover the body 301. In some embodiments, the food product 119 may be a tortilla (marked in FIG. 1B). In other embodiments, the food product may be any other food product capable of being folded onto the body 301. For example, the food product may be flatbread, naan, pita, focaccia, injera, malawach, or pizza crust, among others.

The body 301 may be configured to provide support for the food product when the food product is being heated by the toaster 121 (marked in FIG. 1C). In some embodiments, the support for the food product may be in the form of providing a structure for the food product to be folded onto the body 301. For example, a user may fold a tortilla into a semi-circular shape and slide the folded tortilla onto the body 301. The curved part of the folded tortilla may rest between the clip 303 and the body 301.

In some embodiments, the support for the food product may be in the form of providing a rigid structure that prevents both sides of a folded food product from touching. As depicted, the body 301 has a U-shaped cross section. However, other cross sectional configurations may be used interchangeably according to various embodiments.

The body 301 may have a first side face 311 and a second side face 313 formed by respective sidewalls. The first side face 311 and a second side face 313 may be defined by the length and the height, the first side face 311 being opposite the second side face 313. The body 301 may define a cavity 327 disposed between the respective sidewalls. The first side face 311 and the second side face 313 may take the form of various shapes. As depicted, the first side face 311 and the second side face 313 are semi-circular in shape. However, other shapes may be used interchangeably according to various embodiments. The body 301 may have a bottom side face 315 defined by the length and the width. The bottom side face 315 may be formed by a bottom side wall that may adjoin the respective side walls of the first side face 311 and the second side face 313.

The clip 303 may be configured similarly as the clips 103, 203 discussed in regard to FIGS. 1A-2B, and may include similar features as the clips 103, 203 discussed in regard to FIGS. 1A-2B. For example, the clip 303 may include a plurality of grooves 307 configured similarly as the grooves 107, 207. The clip 303 may define a slot 326 and may include a first portion 330 (configured similarly as the first portions 123, 225) and a second portion 328 (configured similarly as the second portions 125, 227) that defines an entry 332.

The culinary utensil 300 may include a removable handle 305 removably attached to the body 301. The removable handle 305 may have a grip 309 to aid a user in gripping the removable handle 305. In some embodiments, the grip 309 may form an integral part of the removable handle 305. In other embodiments, the grip 309 may a separate component attached to the removable handle 305. The grip 309 may be made of the same material as the removable handle 305. In other embodiments, the grip 309 may be made of silicone or a rubber-like material to facilitate easy gripping and insulation from the heat of the toaster.

In some embodiments, at least one of the body 301, the clip 303, or the removable handle 305 may be manufactured from a metallic material. In other embodiments, at least one of the body 301, the clip 303, or the removable handle 305 may be manufactured form a high temperature plastic material. In some embodiments, at least one of the body 301, the clip 303, or the removable handle 305 may be manufactured from a ceramic material. In one embodiment, at least one of the body 301, the clip 303, or the handle 305 may be made of one or more of a metallic material, a high temperature plastic, or a ceramic material.

Figure 3B:
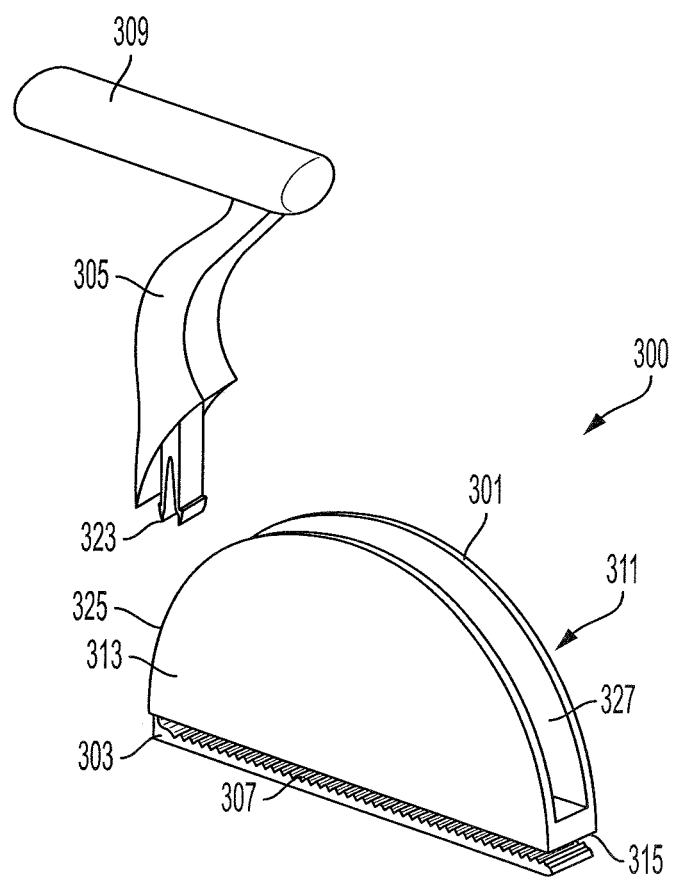
FIG. 3B is a perspective view of the culinary utensil of FIG. 3A according to an embodiment of the present disclosure.
Figure 3C:
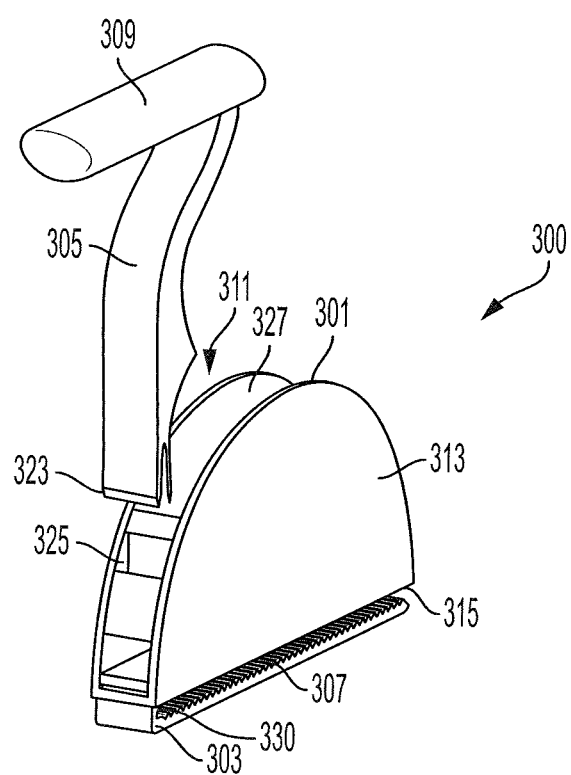
FIG. 3C is a perspective view of the culinary utensil of FIGS. 3A-3B according to an embodiment of the present disclosure.

FIGS. 3B-3C show the culinary utensil 300 of FIG. 3A according to an embodiment of the present disclosure.

As depicted, the removable handle 305 has been removed from the body 301. In some embodiments, the removable handle 305 may have a plug 323 configured to engage with a port 325 located on the body 301. The removable handle 305 may couple to the body 301 when a user forces the plug 323 into the port 325. The removable handle 305 may be decoupled from the body 301 when a user forces the plug 323 out of the port 325. However, other forms of mechanical connection may be used interchangeably according to various embodiments. In one embodiment, the culinary utensil 300 may be utilized without a handle.

The features of the culinary utensil 300 may be utilized with any embodiment of culinary utensil disclosed herein.

Figure 4:
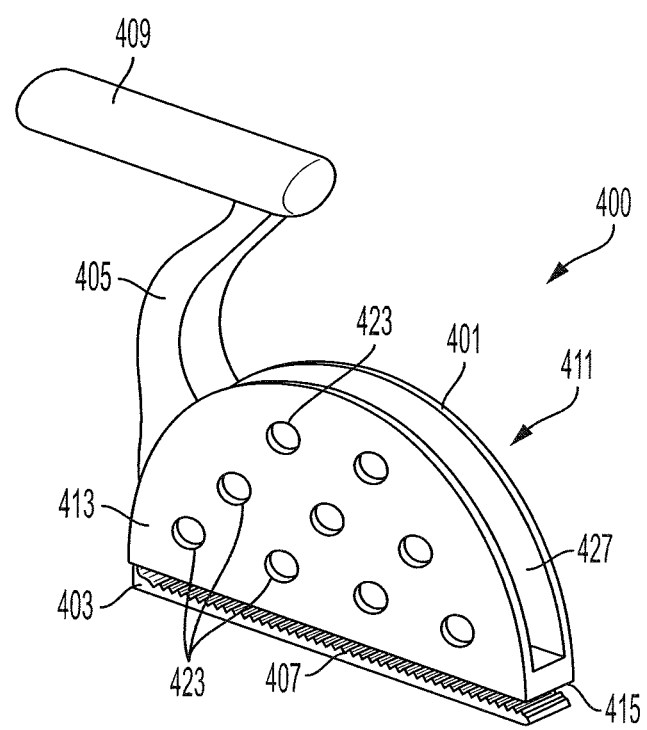
FIG. 4 is a perspective view of a culinary utensil according to an embodiment of the present disclosure.

FIG. 4 shows an embodiment of a culinary utensil 400 for a toaster having a U-shaped body 401, a clip 403, and a handle 405.

The body 401 may have a first side face 411 and a second side face 413 formed by respective side walls. The first side face 411 and the second side face 413 may be defined by the length and the height, the first side face 411 being opposite the second side face 413. The U-shaped body (body) 40.1 may define a cavity 427 disposed between the respective side walls. The first side face 411 and the second side face 413 may take the form of various shapes. As depicted, the first side face 411 and the second side face 413 are semi-circular in shape. However, other shapes may be used interchangeably according to various embodiments. The body 401 may have a bottom side face 415 defined by the length and the width. The bottom side face 415 may be formed by a bottom side wall that may adjoin the respective side walls of the first side face 411 and the second side face 413.

The body 401 may have a plurality of apertures 423 extending through the first side face 411 and the second side face 413. As depicted, the plurality of apertures 423 are circular in shape. However, other shapes may be used interchangeably according to various embodiments.

The clip 403 may be may be configured similarly as the clips 103, 203, 303 discussed in regard to FIGS. 1A-3C, and may include similar features as the clips 103, 203, 303 discussed in regard to FIGS. 1A-3C. For example, the clip 403 may include a plurality of grooves 407 configured similarly as the grooves 107, 207, 307. The handle 405 may be configured similarly as the handles 105, 205, 305 discussed in regard to FIGS. 1A-3C and may include similar features as the handles 105, 205, 305 discussed in regard to FIGS. 1A-3C. For example, the handle 405 may include a grip 409.

The features of the culinary utensil 400 may be utilized with any embodiment of culinary utensil disclosed herein.

Figure 5A:
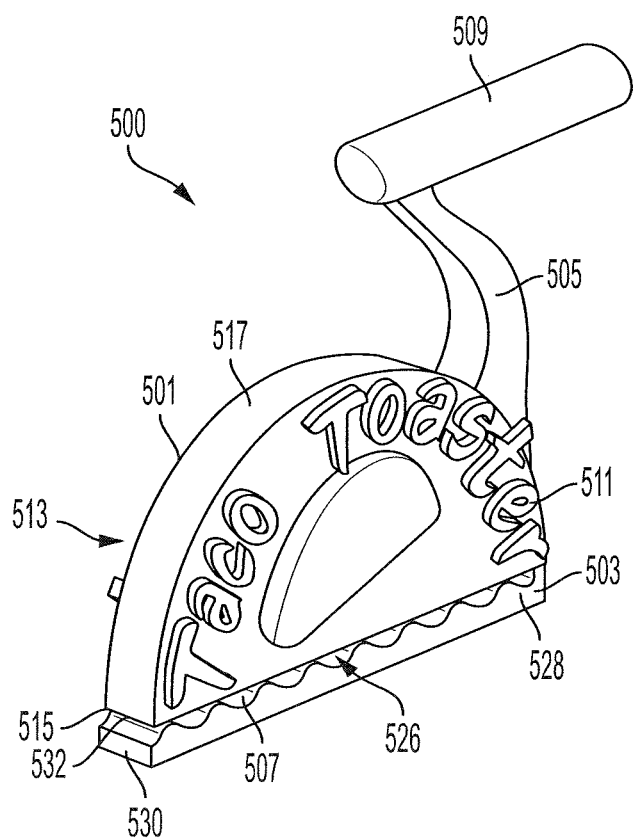
FIG. 5A is a perspective view of a culinary utensil according to an embodiment of the present disclosure.
Figure 5B:
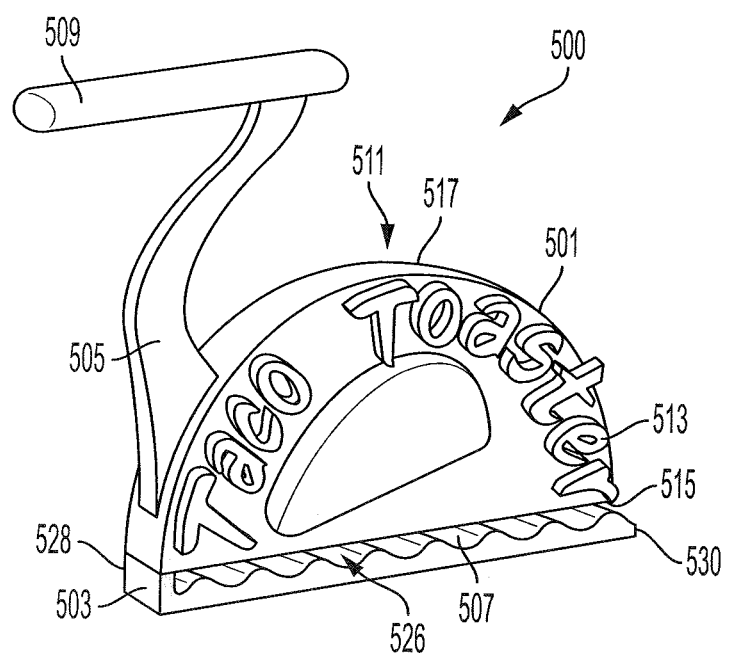
FIG. 5B is a perspective view of the culinary utensil of FIG. 5A according to an embodiment of the present disclosure.

FIGS. 5A-5B shows an embodiment of a culinary utensil 500 for a toaster having a body 501, a clip 503, and a handle 505.

The culinary utensil 500 includes a body 501 that has a length, a width, and a height. The length, width, and height may be dimensioned so as to fit within a standard toaster slot. The body 501 may be configured to be at least partially covered by a food product. In some embodiments, the food product may completely cover the body 501. In some embodiments, the food product 119 may be a tortilla (marked in FIG. 1B). In other embodiments, the food product may be any other food product capable of being folded onto the body 501. For example, the food product may be flatbread, naan, pita, focaccia, injera, malawach, or pizza crust, among others.

The body 501 may be configured to provide support for the food product when the food product is being heated by the toaster 121 (marked in FIG. 1C). In some embodiments, the support for the food product may be in the form of providing a structure for the food product to be folded onto the body 501. For example, a user may fold a tortilla into a semi-circular shape and slide the folded tortilla onto the body 501. The curved part of the folded tortilla may rest between the clip 503 and the body 501.

In some embodiments, the support for the food product may be in the form of providing a rigid structure that prevents both sides of a folded food product from touching. As depicted, the body 501 has a solid cross section. However, other cross sectional configurations may be used interchangeably according to various embodiments.

The body 501 may have a first side face 511 and a second side face 513 each defined by the length and the height, the first side face 511 being opposite the second side face 513. The body 501 may have a bottom face 515 defined by the length and the width. The body 501 may have one or more connecting faces extending between the first side face 511 and the second side face 513. As depicted, the one or more connecting faces is a top face 517.

The first side face 511 and the second side face 513 may take the form of various different shapes. As depicted, the first side face 511 and the second side face 513 are semi-circular in shape. However, other shapes may be used interchangeably according to various embodiments.

The culinary utensil 500 includes a clip 503 coupled to and extending longitudinally along the length of the body 501. The clip 503 may at least partially cover the bottom face 515 of the body 501. The clip 503 may be configured to retain the food product when the food product is placed between the clip 503 and the body 501. For example, after the tortilla has been folded onto the body 501, the culinary utensil 500 may be placed into a slot within the toaster to be heated. After the toaster has completed the heating process, the culinary utensil 500 may be removed from the toaster with the clip 503 providing support to the bottom of the tortilla as the culinary utensil 500 is lifted out of the slot within the toaster.

The clip 503 may be configured similarly as the clips 103, 203, 303, 403 discussed in regard to FIGS. 1A-4, and may include similar features as the clips 103, 203, 303, 403 discussed in regard to FIGS. 1A-4. For example, the clip 503 may define a slot 526 and may include a first portion 528 (configured similarly as the first portions 123, 225, 330) and a second portion 530 (configured similarly as the second portions 125, 227, 328) that defines an entry 532.

The clip 503 may have a plurality of grooves 507 that are configured to provide transfer of heat from the toaster to the food product. For example, when the tortilla is being heated by the toaster, the plurality of grooves 507 provide a pathway for heat to transfer to the bottom of the tortilla. As depicted, the plurality of grooves 507 are sinusoidal in shape. However, other shapes may be used interchangeably according to various embodiments.

The clip may be coupled to the bottom face 515 of the body 501. In some embodiments, the clip may be coupled to the first side face 511 and/or the second side face 513. In other embodiments, the clip 503 may be coupled to the one or more side faces.

In some embodiments, the clip 503 may be configured to bend away from the body 501 to facilitate easier addition and removal of the food product. In other embodiments, the clip 503 may be configured to be a rigid component of the culinary utensil 500. In some embodiments, the clip 503 may provide some friction to the bottom of the food product to prevent the food product from sliding off.

The culinary utensil 500 includes a handle 505 coupled to the body 501. In some embodiments, the handle 505 may be attached to the body 501 via an adhesive or bonding. In some embodiments, the handle 505 and the body 501 may form a single integral part. In other embodiments, the handle 505 may be removably coupled to the body 501.

The handle 505 may have a grip 509 to aid a user in gripping the handle 505. In some embodiments, the grip 509 may form an integral part of the handle 505. In other embodiments, the grip 509 may be a separate component attached to the handle 505. The grip 509 may be made of the same material as the handle 505. In other embodiments, the grip 509 may be made of silicone or a rubber-like material to facilitate easy gripping as well as insulation from the heat of the toaster.

In some embodiments, at least one of the body 501, the clip 503, or the handle 505 may be manufactured from a metallic material. In other embodiments, at least one of the body 501, the clip 503, or the handle 505 may be manufactured form a high temperature plastic material. According to various embodiments, at least one of the body 501, the clip 503, or the handle 505 may be manufactured from a ceramic material. In one embodiment, at least one of the body 501, the clip 503, or the handle 505 may be made of one or more of a metallic material, a high temperature plastic, or a ceramic material.

The features of the culinary utensil 500 may be utilized with any embodiment of culinary utensil disclosed herein.

The features of the embodiments of culinary utensils disclosed herein may be interchanged, substituted, modified, or excluded as desired. The scope of the disclosure is not limited to the culinary utensils disclosed herein, but also extends to the methods of utilizing the culinary utensils.

The embodiments of culinary utensil may be utilized to retain a food product. The food product may be retained for use with a toaster, or may be retained for use with another culinary heating device such as a deep fryer or other form of culinary heating device for heating purposes. In certain embodiments, the embodiments of culinary utensil may be utilized to retain a food product for non-heating purposes, for example, to retain the food product for applying other food products to the food product, or for decorating the food product, or other non-heating purposes. The configurations of culinary utensils may vary from those shown in this application.

The embodiments of culinary utensils may beneficially provide an efficient manner to retain a food product and to heat a food product within a toaster. The sides of the food product may remain exposed to the heating elements of a toaster, to efficiently heat the food product, yet retain a desired form for the food product.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A culinary utensil for a toaster, the culinary utensil comprising:
a body having a first side face and a second side face facing opposite the first side face, and a bottom face having a first end portion and a second end portion and a length extending from the first end portion to the second end portion, the body configured to be at least partially covered by a food product and provide support for the food product when the food product is being heated by the toaster; and a clip extending longitudinally along the bottom face and being positioned from the bottom face to define a slot configured to receive the food product between the clip and the bottom face, and the clip having a first portion and a second portion, the first portion coupled to the body and being positioned at the first end portion of the bottom face, and the second portion defining an entry configured for the food product to be passed through to be received by the slot.

2. The culinary utensil of claim 1, further comprising a handle coupled to the body.

3. The culinary utensil of claim 2, wherein at least one of the body, the clip, or the handle is made of one or more of a metallic material, a high temperature plastic material, or a ceramic material.

4. The culinary utensil of claim 1, wherein the second portion of the clip is positioned at the second end portion of the bottom face.

5. The culinary utensil of claim 4, wherein the entry comprises an opening.

6. The culinary utensil of claim 5, wherein the opening is formed by a space between the second portion of the clip and the second end portion of the bottom face.

7. The culinary utensil of claim 4, wherein the first portion of the clip closes an end of the slot.

8. The culinary utensil of claim 1, wherein the body includes a plurality of apertures extending through and between the first side face and the second side face.

9. The culinary utensil of claim 1, wherein the first side face and the second side face are each semi-circular in shape.

10. The culinary utensil of claim 1, wherein the clip includes a plurality of grooves configured to provide transfer of heat from the toaster to the food product.

11. The culinary utensil of claim 1, wherein the body has a U-shaped cross section or a solid cross section.

12. The culinary utensil of claim 1, wherein the first portion of the clip is a first end portion of the clip, and the second portion of the clip is a second end portion of the clip, and the clip extends longitudinally from the first end portion of the clip to the second end portion of the clip.

13. The culinary utensil of claim 1, wherein the body is configured to be inserted into a heating slot of a toaster.

14. A method comprising:
positioning a food product in a slot of a culinary utensil between a clip and a body of the culinary utensil, the body having a first side face and a second side face facing opposite the first side face, and a bottom face having a first end portion and a second end portion and a length extending from the first end portion to the second end portion, and the clip extending longitudinally along the bottom face and being positioned from the bottom face to define the slot, and the clip having a first portion and a second portion, the first portion coupled to the body and being positioned at the first end portion of the bottom face, and the second portion defining an entry configured for the food product to be passed through to be received by the slot;

positioning the culinary utensil in a heating slot of a toaster with the food product positioned between the clip and the body of the culinary utensil; and heating the food product positioned between the clip and the body of the culinary utensil within the heating slot of the toaster.

15. The method of claim 14, wherein positioning the food product in the slot of the culinary utensil includes sliding the food product in the slot of the culinary utensil.

16. The method of claim 14, wherein the method further comprises folding the food product against both the first side face and the second side face before heating the food product within the heating slot.

17. The method of claim 14, wherein the culinary utensil includes a handle coupled to the body, and the step of positioning the culinary utensil in the heating slot of the toaster includes positioning the handle exterior of the heating slot.

18. A culinary utensil for use to retain a food product, the culinary utensil comprising:

a body configured to be at least partially covered by the food product and provide support for the food product, the body including:
a first side face and a second side face being opposite the first side face, and
a bottom face having a first end portion and a second end portion and a length extending from the first end portion to the second end portion; and a clip configured to retain the food product when the food product is placed between the clip and the body, the clip extending longitudinally along the bottom face and being positioned from the bottom face to define a slot configured to receive the food product between the clip and the bottom face, and the clip having a first portion and a second portion, the first portion coupled to the body and being positioned at the first end portion of the bottom face, and the second portion defining an entry configured for the food product to be passed through to be received by the slot.

19. The culinary utensil of claim 18, wherein:
the body has a length, a width, and a height,
the first side face and the second side face are each defined by the length and the height,
the bottom face is defined by the length and the width, and
the clip is configured to extend longitudinally along the length of the body and at least partially cover the bottom face.

20. The culinary utensil of claim 18, wherein the second portion of the clip is positioned at the second end portion of the bottom face.

* * * * *